United States Patent
Noland

[11] Patent Number: 5,906,347
[45] Date of Patent: May 25, 1999

[54] DRIVE SHAFT CONTAINMENT BRACKET

[76] Inventor: E. Bruce Noland, 205 Wildman St., NE., Leesburg, Va. 22075

[21] Appl. No.: 08/918,669

[22] Filed: Aug. 28, 1997

[51] Int. Cl.[6] .............................. A47G 29/02; F16P 1/00; F16C 1/26
[52] U.S. Cl. ............................ 248/250; 74/609; 464/170
[58] Field of Search .................................... 248/250, 247; 74/609, 608; 464/170, 176, 177, 180

[56] References Cited

U.S. PATENT DOCUMENTS

| 926,800 | 7/1909 | Young | 74/601 |
|---|---|---|---|
| 1,153,467 | 9/1915 | Tynan | 464/170 |
| 1,236,768 | 8/1917 | Sarmiento | 464/170 |
| 2,484,731 | 10/1949 | Pritchett | 464/172 |
| 2,514,089 | 7/1950 | Punsky | 464/176 |
| 2,612,763 | 10/1952 | Hansen | 464/176 |
| 2,984,090 | 5/1961 | Bennett | 464/170 |
| 3,091,101 | 5/1963 | Atkinson | 464/162 |
| 3,111,821 | 11/1963 | Edwards et al. | 464/178 |
| 3,308,901 | 3/1967 | Cislo et al. | 180/349 |
| 3,805,911 | 4/1974 | Le Salver | 180/91 |
| 3,981,376 | 9/1976 | Kluge, Jr. | 180/70 P |
| 4,308,931 | 1/1982 | Khanna | 74/609 |
| 4,501,572 | 2/1985 | Hook | 464/170 |
| 4,663,984 | 5/1987 | Taylor | 74/608 |
| 4,696,660 | 9/1987 | Murphy et al. | 464/170 |
| 5,481,943 | 1/1996 | Kracutler | 74/609 |
| 5,711,710 | 1/1998 | Brisk | 464/170 |

FOREIGN PATENT DOCUMENTS 0 453 964 A1   10/1991   European Pat. Off. .

OTHER PUBLICATIONS

Lakewood Industries Driveshaft Safety Loop (Advertisement), Popular Hot Rodding, p. 54, Nov. 1994.
"Performance Notes—Ladder Bar Basics" by Dave Morgan, Popular Hot Rodding, p. 78, Nov. 1994.

Primary Examiner—Ramon O. Ramirez
Assistant Examiner—Michael Nornberg
Attorney, Agent, or Firm—Nixon & Vanderhye P.C.

[57] ABSTRACT

A drive shaft containment bracket adapted for attachment to a stationary vehicle support surface, the bracket including an elongated body having a mounting flange at one end and a drive shaft containment device at an opposite end. The elongated body has a length dimension sufficient to extend from a vehicle cross frame member supporting the transmission of the vehicle where said mounting flange is utilized to secure said bracket to the cross frame member and transmission casing, rearwardly beyond a universal joint connecting the drive shaft to the transmission to a location along the drive shaft where said containment device at least partially encloses said drive shaft.

16 Claims, 2 Drawing Sheets

DRIVE SHAFT CONTAINMENT BRACKET

TECHNICAL FIELD

This invention relates to a containment device for supporting a vehicle drive shaft in the event of a failure of the forward universal joint.

BACKGROUND

It is known to provide shields or guards for protecting critical or sensitive vehicle components from damage due to rocks, debris, etc. This is especially true for agricultural equipment and other "off-road" vehicles. Examples of covers or guards for transmission gears, universal joints, drive shafts and the like may be found in U.S. Pat. Nos. 926,800; 3,091,101; 3,111,821; 3,981,376; 4,308,931; 4,663,984; and 4,696,660.

In U.S. Pat. No. 5,481,943 there is disclosed a U-shaped enclosure designed to prevent broken portions of a shaft itself from falling to the ground, and for limiting rotation of the broken shaft after it has engaged the enclosure.

There remains a need, however, for a simple, low cost and easy to install drive shaft support, adaptable for use with many different vehicle types and models, for preventing the drive shaft from falling to the ground in the event of a failure of the universal joint which connects the drive shaft to the vehicle transmission.

SUMMARY OF THE INVENTION

This invention provides a unique drive shaft containment bracket which holds the drive shaft substantially in its normal elevated position in the event of failure of the forward universal joint. More specifically, the bracket in accordance with this invention includes an elongated rigid steel body with a mounting flange at one end and a drive shaft containment loop at the opposite end. The mounting flange is designed to facilitate secure attachment of the bracket to a frame cross member supporting the underside of the transmission housing. The opposite end has a closed loop welded thereto which encircles the drive shaft but, in normal use, does not contact the drive shaft. Thus, the drive shaft containment bracket is supported in a cantilevered manner from the frame cross member and transmission housing. It should be noted here that there is no express intent to protect the universal joint, and in fact, the containment loop is located several inches rearward of the joint. Rather, the purpose of this invention is to "catch" the drive shaft in the event of failure of the universal joint, preventing the front end of the drive shaft from falling to the ground and potentially causing further damage to the car and/or driver, or to trailing cars. This is especially important in the auto racing field where falling debris on a crowded track with vehicles traveling at high speeds is a matter of constant concern.

It is also a feature of the invention to include an ultra high molecular weight (UHMW) polyethylene bearing within the containment loop to stabilize the spinning drive shaft after failure of the universal.

Therefore, in its broader aspects, the present invention relates to a drive shaft containment bracket comprising an elongated body having a mounting flange at one end thereof and a drive shaft support at an opposite end thereof, wherein said mounting flange is the sole means by which the bracket is attachable to a vehicle support.

Other objects and advantages of the invention will become apparent from the detailed description which follows.

DETAILED DESCRIPTION OF THE DRAWINGS

Figure 1:
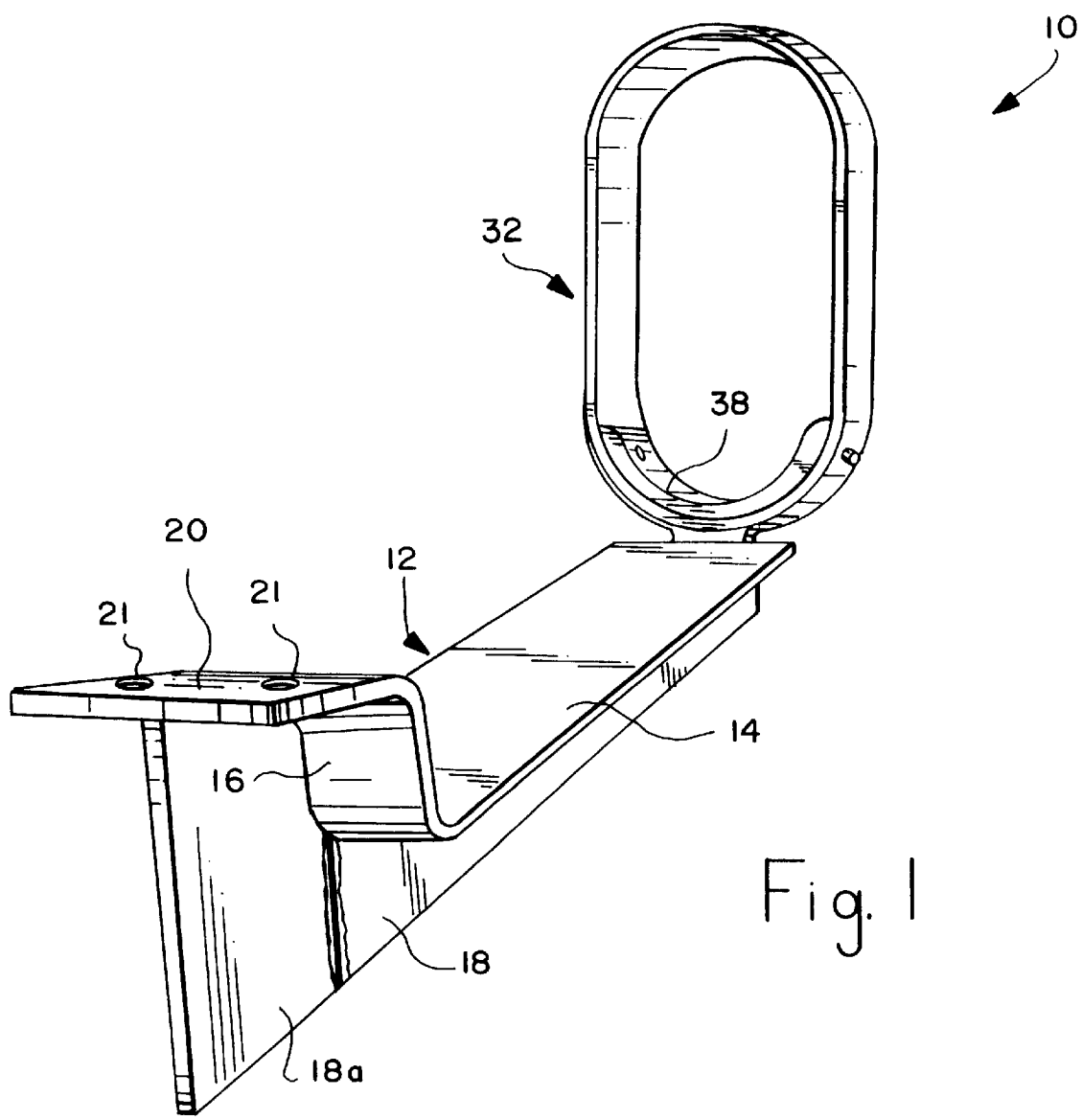
FIG. 1 is a perspective view of the drive shaft containment bracket in accordance with this invention.
Figure 3:
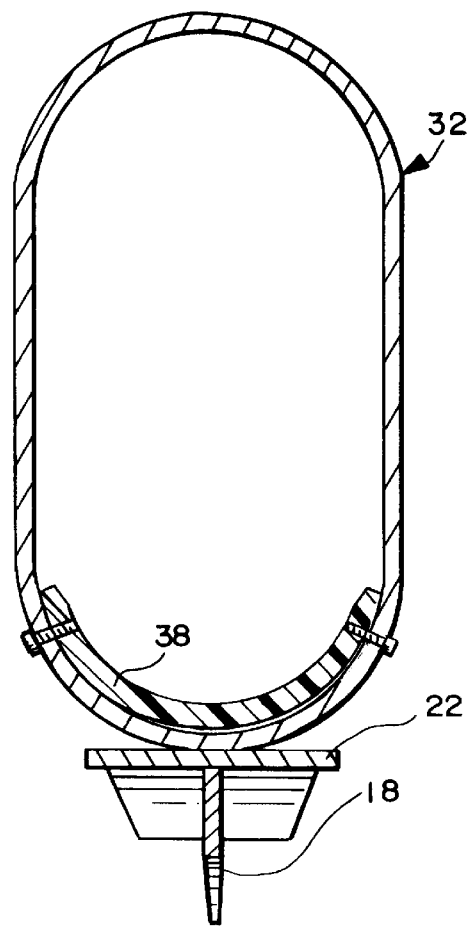
FIG. 3 is a section taken along the line 3—3 of FIG. 2, but with the drive shaft removed.

The drive shaft containment bracket 10 includes a main body portion 12 which includes a rigid steel strip 14, generally horizontally oriented except for an offset 16, and a rigid, vertically oriented steel reinforcement 18 welded to the underside of strip 14 along its entire length. Strip 18 may be comprised of a single component or of a plurality of welded components (forward portion 18a is shown welded to reinforcement 18). The strip 14 has an offset mounting flange 20 at a forward end thereof, and an inclined flange or end 22 at an opposite rearward end thereof. Note that for substantially the entire length of the containment bracket, the arrangement of strip 18 relative to strip 14 creates a substantially T-shape or cross section (see FIG. 3). The mounting flange 20 is offset from the major length portion of the strip 14 by a right angle offset 16. The flange 20 is formed with one or more holes 21 (two shown in FIG. 1) by which the bracket 10 can be fastened to a frame cross member 24 which engages a mounting pad 26 on the underside of the transmission housing 28, using bolts 30 or other suitable fasteners. Fasteners 30 thus extend through the member 24 and into the transmissions housing.

Figure 2:
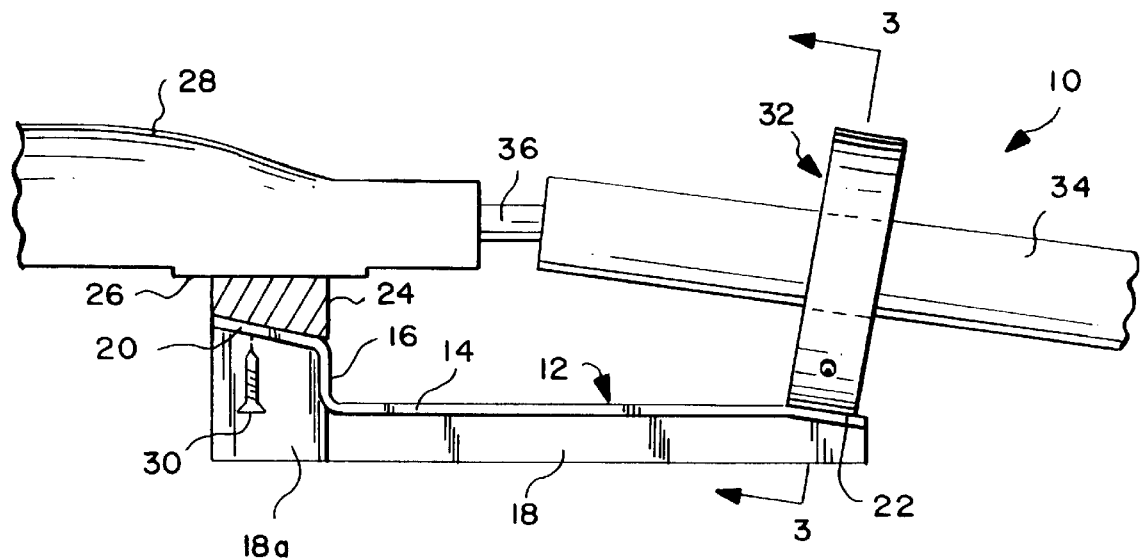
FIG. 2 is a side elevation showing the bracket of FIG. 1 in an installed position.

At the opposite end of the main body portion 12, the inclined end 22 supports the containment device 32. In the exemplary embodiment, the containment device 32 comprises a closed loop, but an open or U-shaped device may also be employed. The inclined end 22 serves to orient the closed loop 32 substantially perpendicular to the axis of the similarly inclined drive shaft 34. The latter connects to the transmission via a conventional universal joint 36. In FIG. 2, both the drive shaft 34 and coupling 36 are shown in simplified form, for the sake of convenience.

In the exemplary embodiment, the bracket 10 has a length dimension of about 24 inches. The various sections 12, 16, 18, 20 may be formed by one or more strips of hot rolled, mild steel in one-piece or in multi-piece welded construction. The strips 14 and 18 may be about two inches wide and ¼ inch thick but the dimensions may vary with specific applications. The closed containment loop 32 may be of rounded rectangular shape (see FIG. 3), with a height of about 6 inches and a width of about 4¾ inches. The strip material (preferably also steel) forming the loop may also have a width of about two inches.

With the bracket 10 in place as shown in FIG. 2, it will be appreciated that shaft 34 will be supported by the containment loop 22 in the event of failure of the universal joint 36. In other words, the drive shaft 34 is prevented from falling onto the ground and potentially causing further damage to the vehicle and/or harm to the driver. In the context of race car applications, the containment of the drive shaft 34 also limits the amount of debris deposited on the track and thus reduces the danger of damage and/or accidents involving trailing cars.

A low friction UHMW bearing 38 is secured to the lower interior surface of the loop 32. Because of its low friction characteristics, the bearing will allow the drive shaft to stabilize after dropping down onto the bearing. In other words, the drive shaft, which may still be rotating for a period of time after failure of the universal joint, will simply spin on the bearing. Absent the bearing, it is likely that the spinning shaft would tend to "crawl" up and down the loop until rotation ceases.

Installation of the bracket 10 is easily accomplished by disconnecting the drive shaft 34 at the universal joint 36, and by sliding the loop 32 over the now unattached end of the drive shaft. The latter is then reconnected to the universal joint 36, and the bracket 10 secured at the mounting flange 20 to the cross frame member 24 and transmission housing 28 via bolts 30.

It will be appreciated that the drive shaft containment bracket of this invention is simple in design, inexpensive to manufacture, and easy to install and remove. Modifications within the scope of the invention include the use of wedge-shape shims to vary the angle of the loop 32 so as to accommodate drive shafts at various angles to horizontal. These shims can be placed between the mounting flange 20 and the vehicle cross frame member 24, and arranged to increase or decrease the angle of the closed loop 32 relative to horizontal.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A drive shaft containment bracket adapted to be secured to a vehicle support comprising:

an elongated body having a mounting flange at one end thereof and a drive shaft support at an opposite free end thereof, wherein said mounting flange is the sole means by which the bracket is attachable to the vehicle support, said elongated body extending substantially parallel to the drive shaft when the bracket is attached to the vehicle support.

2. The bracket of claim 1 wherein said drive shaft support comprises a closed loop fixed to said opposite free end.

3. The bracket of claim 2 wherein said opposite free end is inclined at an angle relative to said elongated body, thereby enabling said closed loop to lie substantially perpendicular to a longitudinal axis of the drive shaft.

4. The bracket of claim 1 wherein said mounting flange is laterally offset from said elongated body.

5. The bracket of claim 3 wherein said mounting flange is laterally offset from said elongated body.

6. The bracket of claim 1 wherein said elongated body comprises a pair of steel strips with a length of about 24 inches and a width of about two inches, arranged to create a substantially T-shaped cross section.

7. The bracket of claim 1 in combination with a vehicle having a transmission and a drive shaft with a universal joint therebetween, and wherein said vehicle support comprises a frame cross member supporting the transmission.

8. The bracket of claim 7 wherein said drive shaft support comprises a closed loop and wherein said drive shaft passes through but does not normally engage said closed loop.

9. The bracket of claim 8 wherein said opposite end is inclined at an angle relative to said elongated body, thereby enabling said closed loop to lie substantially perpendicular to a longitudinal axis of the drive shaft.

10. The bracket of claim 2 and further including a bearing component located within the closed loop.

11. A drive shaft containment bracket adapted for attachment to a stationary vehicle support, said bracket comprising:

an elongated body having a mounting flange at one end and a drive shaft containment device at an end remote from said one end; said elongated body having a length dimension sufficient to extend from a transmission casing of the vehicle where said mounting flange is utilized to secure said bracket to the vehicle support, rearwardly beyond a universal joint connecting the drive shaft to the transmission to a location along the drive shaft where said containment device at least partially encloses said drive shaft.

12. The bracket of claim 11 wherein said drive shaft containment fully encloses said drive shaft within a closed loop fixed to said end remote from said one end.

13. The bracket of claim 12 and further including a bearing component located within the closed loop.

14. The bracket of claim 13 wherein said bearing component is substantially semi-circular in shape and is fixed to a lower end of said closed loop.

15. The bracket of claim 14 wherein said bearing component comprises UHMW polyethylene.

16. The bracket of claim 11 wherein said body includes a pair of mutually perpendicular strips of rigid material such that said elongated body is substantially T-shaped in cross section.

* * * * *